INVENTOR.
PETER L. RICHMAN
BY Arnold & Roylance
ATTORNEYS

Dec. 23, 1969     P. L. RICHMAN     3,486,014
POWER TO DC CONVERTER

Filed April 21, 1966     3 Sheets-Sheet 3

INVENTOR.
PETER L. RICHMAN
BY Arnold & Roylance
ATTORNEYS

United States Patent Office 3,486,014
Patented Dec. 23, 1969

3,486,014
POWER TO DC CONVERTER
Peter L. Richman, Lexington, Mass., assignor to Weston Instruments, Inc., Newark, N.J., a corporation of Delaware
Filed Apr. 21, 1966, Ser. No. 544,213
Int. Cl. G06f *15/20, 15/56;* G06g *7/62*
U.S. Cl. 235—151.31
16 Claims

ABSTRACT OF THE DISCLOSURE

Apparatus for producing a DC signal linearly proportional to the power of a signal to be measured wherein two thermoelectric transducers (e.g., thermistors or thermocouples) are connected to provide an output signal representative of energy provided to heater elements thermally coupled to the transducers. An integrating amplifier accepts the net output of the two transducers and provides feedback signals to the transducer heaters to maintain the transducers at constant, equal operating points, resulting in linear operation. An inverter reverses the feedback to one of the transducers and both signals are summed with DC reference signals. Bridge (thermistor) circuits as well as thermocouple embodiments are disclosed.

---

This invention relates to converters, and more particularly to apparatus for producing a voltage which is proportional to the product of two quantities represented by electrical signals.

The context in which this invention will be described is that of power measurement wherein the voltage of an electrical signal and the current in that signal are combined to provide accurate and continuous power measurement.

A fundamental component in the apparatus of this invention is a thermoelectric transducer, which term, in this context, refers to a device which produces thermal energy by dissipation of electrical energy and which then responds to that thermal energy to produce or to modify an electrical signal. Included in this generic term are thermocouples thermally coupled to one or more resistance heating elements, and a thermistor or other forms of bolometer, the characteristic electrical resistance of which varies with changes in temperature, this also being thermally coupled to one or more resistance heating elements.

It will be recognized by those skilled in the art that thermoelectric transducers which incorporate thermocouples are inherently square law devices. When an electrical signal is applied to a resistance, the heat produced by resistive dissipation is equal to the resistance times the square of the root-mean-square (RMS) value of the current. When a thermocouple is disposed adjacent the resistance element, a voltage is produced which is proportional to the temperature of the element. The generated voltage is thus proportional to the square of the RMS value of the current applied.

The same kind of behavior is found in a thermoelectric transducer which includes a device such as a bolometer, except that the change caused is a change in current flow due to a change caused is a change in current flow due to a change of resistance rather than of the voltage produced. Thus, the current flowing in a series circuit comprising a constant voltage source and a thermistor and thus to the magnitude of the current applied to a heating element thermally coupled to the thermistor. This need not be square-law behavior, but will nevertheless be sufficiently temperature dependent to be usable in the apparatus of the present invention.

It will be obvious that the current applied to the heating element can be either AC or DC, and that the frequency of the AC applied is of no significance over a very broad spectrum.

However, in practical circuits using these phenomena, without the addition of compensating circuitry, it is not possible to obtain a DC output which is linearly proportional to the power input. In a circuit for measuring power wherein two thermocouples are used, the operating points of those thermocouples change with changes of input current and voltage so that in reality the thermocouple output voltage is no longer proportional to the current squared over the entire operating range. In addition, two thermocouples so interconnected will not necessarily display the same errors, so that the operating points are not only variable but are unequal. These deviations from ideal square-law performances can result in substantial errors, on the order of several percent. Furthermore, the output voltages of thermoelectric transducers are inherently rather small so that the errors discussed above are magnified still further, especially at low values of input voltage and current, as a result of thermal EMF's, noise generated in output circuit components, and drift.

An object of the present invention is to provide apparatus incorporating thermoelectric transducers to accomplish linear power-to-DC conversion.

Another object is to provide apparatus for accepting electrical signals representative of voltage and current and for producing an electrical signal proportional to power.

Yet another object is to provide an apparatus which employs thermoelectric transducers to convert power contained in input signals to DC voltages, and which overcomes the problems of variable operating points, unequal operating points, and low output potentials characteristic of such transducers.

A still further object is to provide apparatus using thermocouples and thermistors in combination with operational amplifiers and feedback circuits to provide power to DC conversion with true linear operational characteristics.

In order that the manner in which the foregoing and other objects are attained in accordance with the invention can be understood in detail, particularly advantageous embodiments thereof will be described with reference to the accompanying drawings, which form a part of this specification and wherein.

Figures 1, 2:
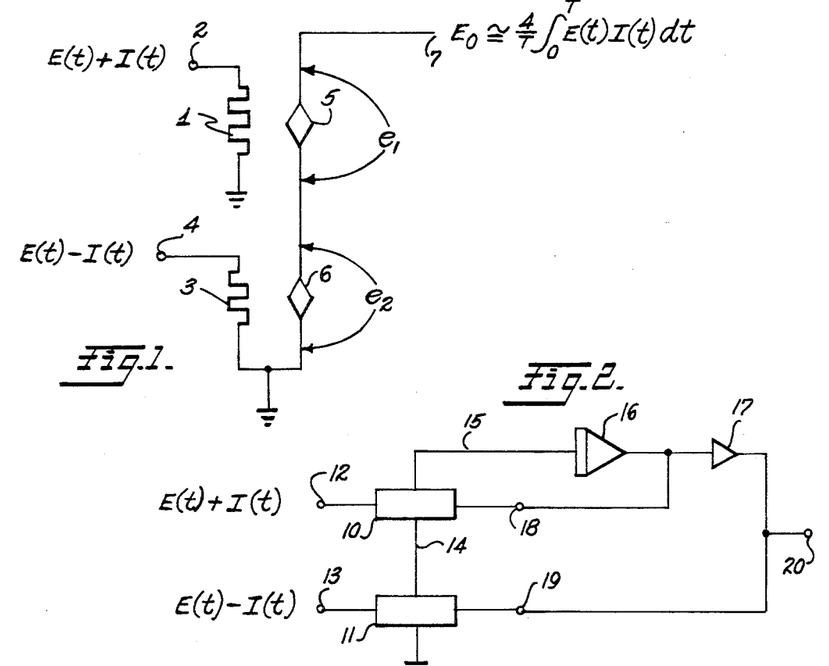
FIG. 1 is a schematic diagram of a thermoelectric transducer of a type usable in the subject invention.
FIG. 2 is a schematic diagram, partly in block form, of the feedback circuits of the invention.

Referring now to FIG. 1, a resistive heating element 1 is connected between a first input terminal 2 and ground, heating element 1 being a conventional type of resistance heater which produces heat as a function of the square of the current passed through the heater. A second heating element 3 of the same type as element 1 is connected between a second input terminal 4 and ground. Thermocouples 5 and 6 are connected in series opposing circuit relationship between an output terminal 7 and ground, thermocouple 5 being thermally coupled to heating element 1 so that the heat produced by element 1 directly changes the temperature of thermocouple 5, and so that the characteristics of the thermocouple respond as nearly as possible to the changes in the current passed through element 1. Thermocouple 6 is similarly thermally coupled to element 3. In this context, it will be recognized by those skilled in the art that the term "thermocouple" is used to include any of a number of dissimilar metal junctions which exhibit a potential difference varying with temperature as physically described in terms of the Seebeck effect, the Peltier effect or the Thomson effect.

As shown in FIG. 1, if a current equal to the sum of the voltage and current of an electrical signal is applied to terminal 2 and thus to heater element 1, both voltage and current being expressed as functions of time, the voltage $e_1$ produced by thermocouple 5 will be (1) $$e_1 = \frac{K_1}{T} \int_0^T [E(t) + I(t)]^2 dt$$

where T is temperature, and $K_1$ is a constant which is dependent on the physical characteristics of thermocouple 5. Similarly, the voltage $e_2$ produced by thermocouple 6 can be expressed as (2) $$e_2 = \frac{K_2}{T} \int_0^T [E(t) - I(t)]^2 dt$$

where $K_2$ is the constant for thermocouple 6.

Expanding the integral of Equation 1, $$e_1 = \frac{K_1}{T} \left[ \int_0^T E^2(t) dt + \int_0^T I^2(t) dt + 2\int_0^T E(t)I(t) dt \right]$$

(3)

Similarly expanding Equation 2, $$e_2 = \frac{K_2}{T} \left[ \int_0^T E^2(t) dt + \int_0^T I^2(t) dt - 2\int_0^T E(t)I(t) dt \right]$$

(4)

By connecting thermocouples 5 and 6 in series so that the voltages produced by the two thermocouples are subtracted, the voltage appearing at terminal 7 will be equal to $e_1 - e_2$. The expression for this voltage can be found by subtracting Equation 4 from Equation 3, with the further assumption that the constants for the two thermocouples can be made equal, thus resulting in the following expression:

(5) $$e_1 - e_2 = E_0 = \frac{4K}{T} \int_0^T E(t)I(t) dt$$

It will be recognized that this expression states a voltage proportional to the product of voltage and current, or, in other words, a voltage linearly proportional to power.

The above explanation would seem to indicate that the simple circuit of FIG. 1 should allow a simple measurement of power by connecting two heating elements and two thermocouples as shown. However, as discussed above, in a practical circuit, the outputs of two thermocouples for equivalent heat inputs do not remain equal throughout the range of currents applied to the heating elements associated with the two thermocouples, or with the variations in temperature of the thermocouples, and further, the characteristics do not necessarily change at the same rate with temperature changes. It is therefore necessary to provide compensation in order to obtain an accurate measure of power over a useful range.

A basic circuit for performing this function is shown in FIG. 2 and includes a first thermoelectric transducer 10 and a second thermoelectric transducer 11 which are connected respectively to an input terminal 12 and an input terminal 13. Transducers 10 and 11 include devices of the types shown in FIG. 1, each including a temperature responsive element such as the thermocouples 5 and 6 and heating elements such as elements 1 and 3. However, as will be seen in the various embodiments of this invention shown in later figures, the temperature responsive elements may also be temperature responsive resistances, and more than one heating element may be included within each transducer.

As in FIG. 1, the temperature responsive elements within transducers 10 and 11 are connected in series via a conductor 14 and the output of the two temperature responsive elements is connected by a conductor 15 to a high gain amplifier 16, shown in FIG. 2 as an integrating amplifier. The output of amplifier 16 is connected to the input of an amplifier 17, and also to a second input terminal 18 to transducer 10. The output of amplifier 17 is connected to a second input terminal 19 to transducer 11 and is also connected to the system output terminal 20 at which the desired voltage representative of power appears. It will be seen that the various embodiments of this invention can all be related to this basic block diagram as shown in FIG. 2, although the feedback circuits may include other elements for purposes of establishing operating points and rates of variation.

Figure 3:
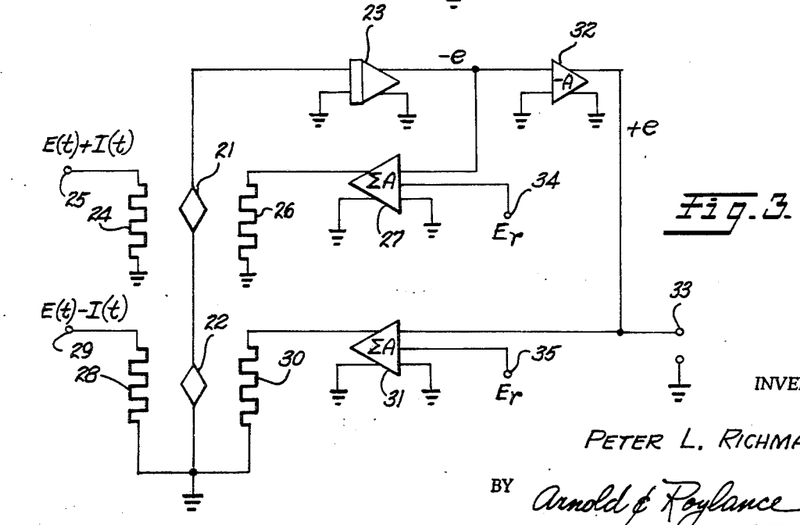
FIG. 3 is a schematic diagram of a first embodiment of the invention including means for maintaining two thermocouples at identical operating points.

The operation can be understood in greater detail by reference to FIG. 3, wherein a thermocouple 21 and a thermocouple 22 are connected in series circuit relationship, the output of the two thermocouples being connected to the input terminal of an integrating amplifier 23. Thermocouple 21 is thermally coupled to a heater element 24, which is connected between an input terminal 25 and ground. Thermocouple 21 is also thermally coupled to a heater element 26 which is connected between the output terminal of a summing amplifier 27 and ground. Thermocouple 22 is thermally coupled to a heater element 28 which is connected between an input terminal 29 and ground, and is also thermally coupled to a heater element 30 which is connected between ground and the output terminal of a summing amplifier 31.

The output of integrating amplifier 23 is connected to the input of an operational amplifier 32, and also to one input terminal of summing amplifier 27. The output of amplifier 32 is connected to a system output terminal 33, and also to one input terminal of summing amplifier 31.

Each of summing amplifiers 27 and 31 has two inputs, the other inputs to these amplifiers being connected to terminals 34 and 35, to which a source of DC reference voltage $E_r$ is connected.

The apparatus of FIG. 3 shows a means for operating the two thermocouples at an identical operating point even though this point is variable with input voltage and current. This operating mode can be referred to as equithermal operation. Each thermocouple is provided with a primary heater and an auxiliary heater, the primary heaters being 24 and 28 and the auxiliary heaters being 26 and 30. As described with reference to FIGS. 1 and 2, input terminal 25, and thus heater 24, is provided with a voltage representative of the sum of the voltage and current, each expressed as a function of time. Likewise, terminal 29 and heater 28 are provided with the difference between these quantities. These constitute the total input signals for application to the primary heaters and thus, after the energy conversion performed by the heaters, to thermocouples 21 and 22. However, in this circuit the difference between the output potentials $e_1$ and $e_2$ is not measured directly, but is applied to the input of a high gain operational integrator 23 which provides a DC signal at its output terminal which is designated as $-e$. This signal is furnished to amplifier 32 which is a unity gain inverting amplifier, the output of which is $+e$. The $-e$ and $+e$ sginals are supplied to summing amplifiers 27 and 31, respectively. Amplifier 27 sums the $-e$ signal with the reference voltage $E_r$ supplied from terminal 34, and amplifier 31 combines the $+e$ signal with the reference voltage $E_r$ supplied at terminal 35. The $+e$ potential is, as will be seen, the desired output potential because it is proportional to the power represented by the product of the time functions of voltage and current supplied as input signals.

The outputs of amplifiers 27 and 31 are provided to drive heaters 26 and 30 to maintain thermocouples 21 and 22 at equal operating points.

To verify the fact that the output potential provided at terminal 33 is in fact proportional to input power, an analysis similar to that expressed by Equations 1 through 5 can be considered. First, observe that the output of thermocouple 21, which will be referred to as $e_1$ is now a function of the energy supplied to both of heaters 24 and 26. Specifically, $$e_1 = \frac{K_1}{T} \int_0^T [E(t)+I(t)]^2 dt + \frac{K_1}{T} \int_0^T (E_r - e)^2 dt \quad (6)$$

Expanding this expression, it will be seen that $$e_1 = \frac{K_1}{T}\int_0^T E^2(t)dt + \frac{K_1}{T}\int_0^T I^2(t)dt + \frac{2K_1}{T}\int_0^T E(t)I(t)dt + K_1 E_r^2 + K_1 e^2 - 2K_1 E_r e \quad (7)$$

Similarly, the output potential $e_2$ for thermocouple 2 may be solved as $$e_2 = \frac{K_2}{T}\int_0^T [E(t)-I(t)]^2 dt + \frac{K_2}{T}\int_0^T (E_r+e)^2 dt \quad (8)$$

which expands as $$e_2 = \frac{K_2}{T}\int_0^T E^2(t)dt + \frac{K_2}{T}\int_0^T I^2(t)dt - \frac{2K_2}{T}\int_0^T E(t)I(t)dt + K_2 E_r^2 + K_2 e^2 + 2K_2 E_r e \quad (9)$$

When the sum of the thermocouple potentials $e_1$ and $-e_2$ are set equal to zero, as implied by their connection to each other and to the input of the very high gain amplifier 23, most of the terms drop out and the net result, assuming again that $K_1$ is equal to $K_2$, is $$(10) \quad \frac{4K}{T}\int_0^T E(t)I(t)dt = 4K e E_r$$

This simplifies to $$(11) \quad e = \frac{1}{E_r T}\int_0^T E(t)I(t)dt$$

in which it will be seen that the voltage $e$ appearing at the output of amplifier 32 and thus at output terminal 33, is proportional to the input power as desired, the term $E_r$ being a constant chosen to insure that the power given into the auxiliary heaters will always remain positive.

Figure 4:
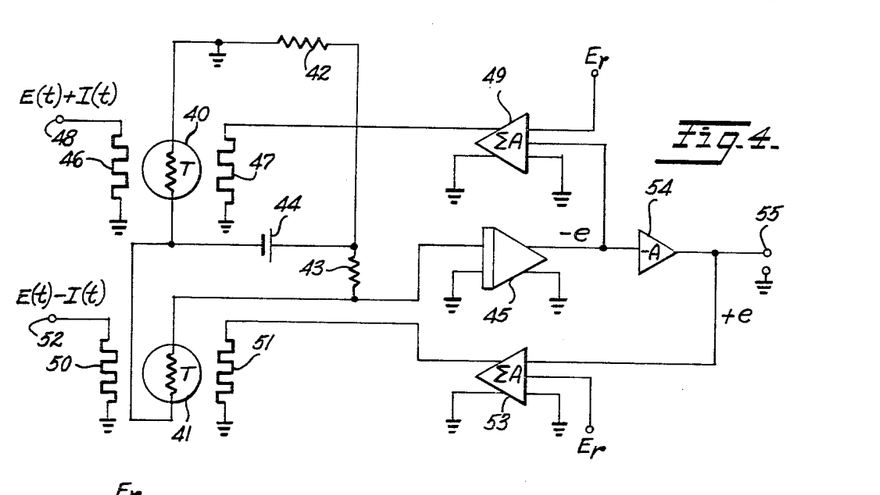
FIG. 4 is a schematic diagram of a second embodiment of the invention wherein thermistors are maintained at identical operating points.

With the realization that the relationship between input power and output need not be square-law but need merely be the same for the two thermosensitive elements, it follows that temperature sensitive resistors, or thermistors, rather than thermocouples, can be used in the thermoelectric transducers, as shown in the embodiment of FIG. 4. In FIG. 4, a thermistor 40 and a thermistor 41 are connected as two adjacent legs of a bridge circuit, a resistor 42 and a resistor 43 forming the other two legs of the bridge. A substantially constant source of DC voltage, shown as a battery 44, is connected across the bridge from the junction of the two thermistors to the junction of the other two resistors. One end of the bridge is grounded and the other end of the bridge at the junction of thermistor 41 and resistor 43 is connected to the input terminal of integrating operational amplifier 45.

A heater element 46 and a heater element 47 are thermally coupled to thermistor 40. Heater 46 is connected between an input terminal 48 and ground, and heater 47 is connected between ground and the output of a summing amplifier 49.

A heater 50 and a heater 51 are thermally coupled to thermistor 41, heater 50 being connected between an input terminal 52 and ground and heater 51 being connected between ground and the output terminal of summing amplifier 53.

The output of integrating amplifier 45 is connected to the input terminal of an operational amplifier 54, the output of which is connected to an output terminal 55 at which the voltage proportional to power appears, and is also connected to one input of summing amplifier 53. The output of integrating amplifier 45 is also connected to one input of summing amplifier 49. As before, the other inputs of summing amplifiers 49 and 53 are both connected to terminals to which a DC reference voltage, $E_r$, is supplied.

As previously discussed, the input signals to the embodiment of FIG. 4 include the sum and difference of the voltage and current, both expressed as functions of time. The resistances of thermistors 40 and 41 are functions of the thermal energy produced by current dissipation of those input signals in heaters 46 and 50, and also of current dissipation in heaters 47 and 51. With the junction of thermistor 40 and resistor 41 being grounded, the bridge error signal as generated by current flow from battery 44 through the four legs of the bridge, appears at the junction of resistor 43 and thermistor 41, this error signal being supplied to amplifier 45. This error signal will be something other than zero when the resistance of thermistor 40 is different from the resistance of thermistor 41, assuming equality between resistors 42 and 43, a matter which can be simply arranged by adjustment. Amplifier 45 is again a high gain operational integrator as was amplifier 23 in FIG. 3, the output of amplifier 45 again being designated $-e$. Also as before, the $-e$ signal is applied to inverting unity gain amplifier 54, the output of which is $+e$. The positive and negative signals are summed with the reference voltage $E_r$ by amplifiers 49 and 53, respectively, which drive auxiliary heaters 47 and 51 as before. Again, the potential $+e$ is the output signal of the apparatus, and again, by the same analysis as that discussed previously, is linearly proportional to input power. The analogy between the apparatus of FIG. 3 and FIG. 4 is a simple one, the primary difference being the use of thermistors in a bridge circuit to develop the required error signal rather than the use of series connected thermocouples.

However, a significant advantage is attained by using thermistors in a bridge. The output from the thermistor bridge can be more than an order of magnitude greater, for a given error signal, than was the output from the series-connected thermocouples. The requirements for operational integrator 45 are therefore less stringent than those for the analogous amplifier 23 of FIG. 3, providing a substantial advantage in the practical application since the amplifier employed can be somewhat less expensive and yet provide far greater resolution and accuracy.

Figure 5:
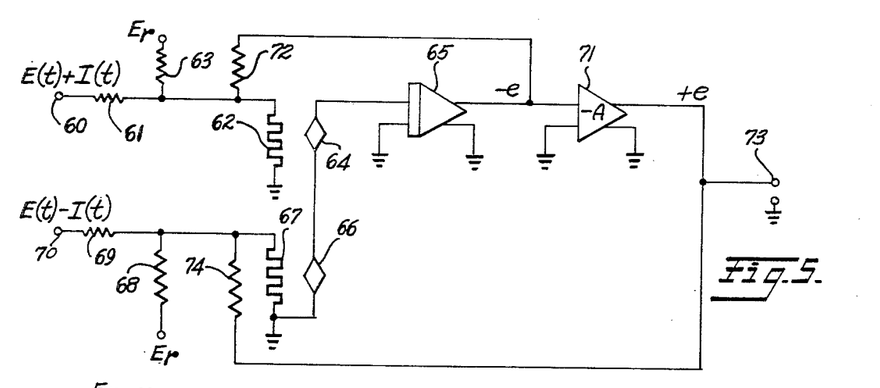
FIGS. 5 and 6 are schematic diagrams of third and fourth embodiments of the invention which include means for maintaining equal operating points of thermocouples and thermistors, respectively, without the auxiliary heating elements of FIGS. 3 and 4.
Figure 6:
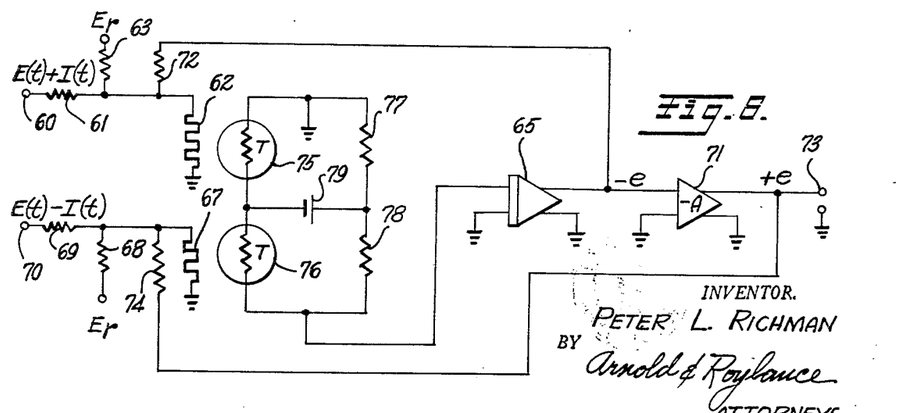

Another approach to the problem is shown in FIGS. 5 and 6 wherein thermocouple and thermistor circuits are shown, respectively, in thermoelectric transducers wherein only one heater is used and wherein feedback signals are provided to those same heaters to which input signals are supplied. It should be noted that a limitation exists in the operation of the embodiments of FIGS. 5 and 6 in that these circuits are usable with input signals which have no DC component, or a DC component which cannot be conveniently blocked without sacrifice of accuracy. The reason for this limitation will become apparent.

In FIG. 5 an input terminal 60 is connected via an input resistor 61 to one terminal of a heater element 62, the other terminal of which is grounded. A resistor 63 is connected between a source DC reference voltage $E_r$ and the ungrounded terminal of heater 62. Heater 62 is thermally coupled to a thermocouple 64, one terminal of which is connected to the input terminal of an operational integrating amplifier 65 and the other terminal of which is connected to another thermocouple 66. The other terminal of thermocouple 66 is connected to ground. Thermocouple 66 is thermally coupled to a heater element 67, one terminal of which is connected to ground and the other terminal of which is connected to one terminal of a resistor 68, the other terminal of which is connected to a source of DC reference voltage $E_r$ and to one terminal of a resistor 69, the other terminal of which is connected to a signal input terminal 70.

The output terminal of integrating amplifier 65 is connected to the input terminal of a unity gain inverting amplifier 71 and via a resistor 72 to the ungrounded terminal of heater 62. The output of amplifier 71 is connected to system output terminal 73 and also via a resistor 74 to the ungrounded terminal of heater 67.

It will be readily apparent that the circuit of FIG. 5, since its does not employ a thermoelectric transducer having two heaters for each thermosensitive element, is a simpler unit in construction and therefore less expensive. It does, however, operate on the same general principles discussed with reference to FIGS. 3 and 4 in that the DC feedback signal appearing as an output of operational integrating amplifier 65, again designated $-e$, is passed through a heating element and acts to adjust the operating point of thermocouple 64. Likewise, the output of inverting amplifier 71, again designated as $+e$, is delivered as feedback signal via resistor 74 to heater 67 and similarly adjusts the operating point of thermocouple 66. The circuit of FIG. 5 takes advantage of the fact the DC feedback signals $-e$ and $+e$ and the reference signal $E_r$ are by definition orthogonal with the input signals $E(t)$ and $I(t)$ which are assumed to have no DC components, when applied to the embodiments of FIGS. 5 and 6. Thus the signals can be applied to the same heating elements without detrimental effect. The error signal is derived as before from the series connection of the two thermocouples 64 and 66 and converted into the appropriate feedback signals, the $+e$ signal also being the output from the entire system. The feedback signals are applied directly via a resistive adder including resistors 61, 63 and 72 associated with heater 62, and another adder including resistors 68, 69 and 74 associated with heater 67. The power ($I^2R$) in the feedback signals and the power in the input signals are still directly additive in the heaters of the thermoelectric transducers because the signals are orthogonal. Thus, the equations given previously with reference to FIGS. 3 and 4 apply with equal force with reference to FIGS. 5 and 6. In addition to the simplicity attained in the embodiments of FIGS. 5 and 6, these embodiments also have the advantage of eliminating any difficulties arising from small unbalances in the two heaters associated with each thermosensitive element in FIGS. 3 and 4.

In FIG. 6, the interconnection of elements is exactly the same as FIG. 5 with the exception of thermocouples 64 and 66 which are replaced in FIG. 6 by a thermistor bridge arrangement as discussed with reference to FIG. 4. In FIG. 6, a thermistor 75 and a thermistor 76 are connected as two legs of a thermistor bridge with a resistor 77 and a resistor 78 being connected at the other two legs of the bridge. The junction of thermistor 75 and resistor 77 is grounded, and the junction of thermistor 76 and resistor 78 is connected as the signal inputs to operational integrating amplifier 65. A DC source, shown as a battery 79, is connected between the remaining junctions in the bridge circuit. The operation of the embodiment of FIG. 6 need not be further described, the elements of this embodiment having been fully described with reference to FIG. 5 and FIG. 4.

Figure 7:
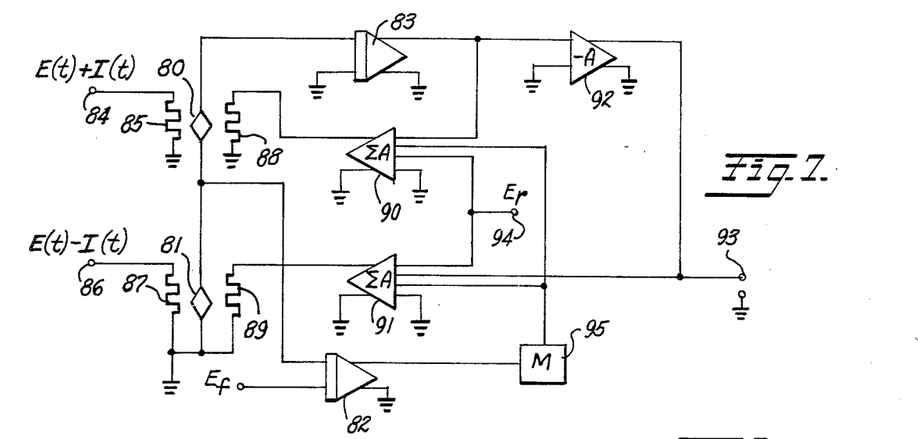
FIG. 7 is a schematic diagram of a fifth embodiment of the invention including means for maintaining the operating points of two thermocouples at a constant temperature.

In FIG. 7, an apparatus is shown wherein the operating points of the thermocouples of two thermoelectric transducers are maintained not only equal to each other but constant at a predesignated value. This form of operation can be referred to as isothermal operation as opposed to the equithermal operation attained in the embodiments of FIGS. 3, 4, 5 and 6. With isothermal operation, the performance of the apparatus will be a function of the operation of each thermosensitive element at only a single point on its characteristic curve. Thus, any discrepancies between operating characteristics of the two elements used will be totally removed from the system so that system accuracy on the order of .01 to .02 percent is entirely within reason.

In FIG. 7, a thermocouple embodiment of this system is shown wherein a thermocouple 80 is connected in series circuit relationship with a thermocouple 81, the junction of the two thermocouples being connected to one input terminal of an integrating operational amplifier 82. The other terminal of thermocouple 81 is connected to ground and the other terminal of thermocouple 80 is connected to an operational integrating amplifier 83. Another input terminal of amplifier 82 is connected to a source of DC reference voltage $E_f$. An input terminal 84 is connected to one terminal of a heater element 85, the other terminal of which is connected to ground. An input terminal 86 is connected to one terminal of a heater element 87, the other terminal of which is also connected to ground. Heater 85 is thermally coupled to thermocouple 80, and heater 87 is thermally coupled to thermocouple 81.

A heater element 88, also thermally coupled to thermocouple 80, is connected between ground and the output terminal of a summing operational amplifier 90. A heater element 89 is connected between ground and the output terminal of a summing operational amplifier 91.

The output terminal of integrating amplifier 83 is connected to the input terminal of a unity gain inverting amplifier 92, the output terminal of which is connected to system output terminal 93 and also to one input terminal of summing amplifier 91. The output of integrating amplifier 83 is also connected to one input of summing amplifier 90.

Summing amplifiers 90 and 91 are of a type which have three input terminals and which are capable of combining three simultaneously applied input signals. The second input terminals of each of amplifiers 90 and 91 are connected to a source of DC reference voltage $E_r$ at terminal 94.

The output of integrating operational amplifier 82 is connected to the input terminal of a modulator circuit 95, the output of which is connected to the third input terminals of each of amplifiers 90 and 91. Modulator circuit 95 is a DC to AC conversion circuit capable of accepting a DC input and producing an AC input, the magnitude of which is roughly proportional to the applied DC.

It will be recognized that the embodiment of FIG. 7 is analogous in many respects to the embodiment of FIG. 2, in that two thermocouples are series connected, each is thermally coupled to two heater elements to form two thermoelectric transducers, and one heater of each transducer is supplied with the previously described time functions of voltage and current. The output of this series connection is integrated and amplified to produce a $-e$ feedback signal, that being inverted to produce a $+e$ feedback signal, and the two feedback signals are summed with a reference voltage to produce the driving current for the auxiliary heaters, in this case heaters 88 and 89.

However, in FIG. 7 an additional signal is developed by taking an error signal voltage from the point between the two thermocouples, monitoring and comparing that error voltage against a reference potential, amplifying and integrating the difference between the error signal and the reference potential, and converting the resulting DC signal into an AC signal in modulator 95, this resulting AC signal then being summed in amplifiers 90 and 91 with the previously described feedback signals and reference voltage.

With the addition of this auxiliary feedback loop, it will be seen that any deviation from the operating point initially established, as detected by comparison of the thermocouple voltages with the reference voltage $E_f$, will be detected and corrected for by the appropriate addition or subtraction of power in the summing amplifiers 90 and 91 from the driving currents applied to heaters 88 and 89. Thus, not only are the operating points of thermocouples 80 and 81 rendered equithermal by the operation of the feedback circuit of the type shown in FIG. 2, but these operating points are maintained at a preselected constant point on their characteristic curves, that is to say, they are rendered isothermal.

The purpose of converting the DC signal supplied by amplifier 82 into an AC form by modulator 95 is so that the power produced by the voltage from modulator 95 will add linearly with the power proportional to the $(E_r+e)$ and $(E_r-e)$ voltages already being added in amplifiers 90 and 91. For these powers to add linearly, it is necessary that the inserted auxiliary feedback voltage must be orthogonal to the DC voltages, i.e., it is necessary that the integral of their cross product be zero. This is readily achieved by maintaining one of the signals as a DC signal and using AC as the other.

Figure 8:
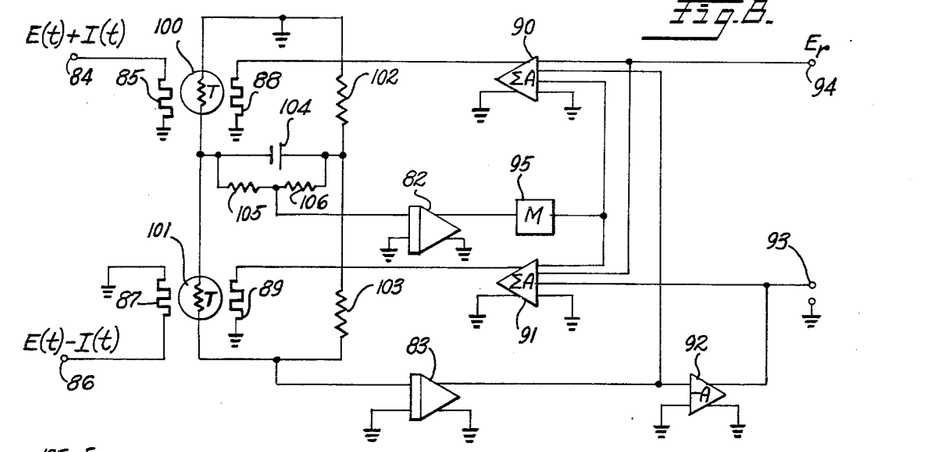
FIG. 8 is a schematic diagram of a sixth embodiment of the invention including a thermistor circuit having constant temperature operation analogous to the embodiment of FIG. 5.

FIG. 8 shows a thermistor circuit which is analogous to the thermocouple circuit discussed with reference to FIG. 7. With the exception of the thermistors and the bridge circuit in which they are incorporated, the circuits of FIG. 7 and FIG. 8 are the same, and need not be described in detail. The various circuit elements in FIG. 8 which correspond to those in FIG. 7 are similarly numbered, and only those portions which differ are identified separately and will be described.

The basic bridge circuit employed in the embodiment shown in FIG. 8 is basically the same as that described with reference to FIGS. 6 and 4, and includes a thermistor 100 and a thermistor 101 connected in series circuit relationship as two adjacent legs of a bridge circuit. A resistor 102 and a resistor 103 form the other two legs of the bridge circuit, with the junction of resistor 102 and thermistor 100 being grounded, the junction of thermistor 101 and resistor 103 being connected to the input of integrating amplifier 83 and a DC source, shown as a battery 104, being connected between the other two junctions of the bridge circuit. The error signal pickoff point, analogous to the connection between the thermocouples in FIG. 7, is obtained by connecting a resistor 105 and a resistor 106 in series circuit relationship with each other and in parallel with battery 104 across the bridge between the junction of the two thermistors and the junction of resistors 102 and 103. The error signal pickoff junction is between resistors 105 and 106, this junction being connected to the input of operational integrating amplifier 82. In FIG. 8, the output resistance of thermistor 101 is compared with a reference resistor 105 in an auxiliary bridge within the main bridge, the arms of the auxiliary bridge being thermistor 100, resistor 105, resistor 106 and resistor 102. The output from this auxiliary bridge, taken from the junction of resistors 105 and 106, is applied as an error signal for the auxiliary feedback loop to the input of integrating amplifier 82. It will be noted that no DC reference voltage equivalent to the reference voltage $E_f$ of FIG. 7 is necessary in the embodiment of FIG. 8 because the input signal to amplifier 82 is established at zero when the resistance of thermistor 100, and implicitly the resistance of thermistor 101, is equal to the reference resistor 105. This likewise requires that the resistance of resistor 102 has initially been set equal to resistance 105. As in the embodiment of FIG. 7, the output of amplifier 82, a DC voltage, is applied to modulator 95 which converts this DC voltage into an AC voltage which is supplied to summing amplifiers 90 and 91.

Figure 9:
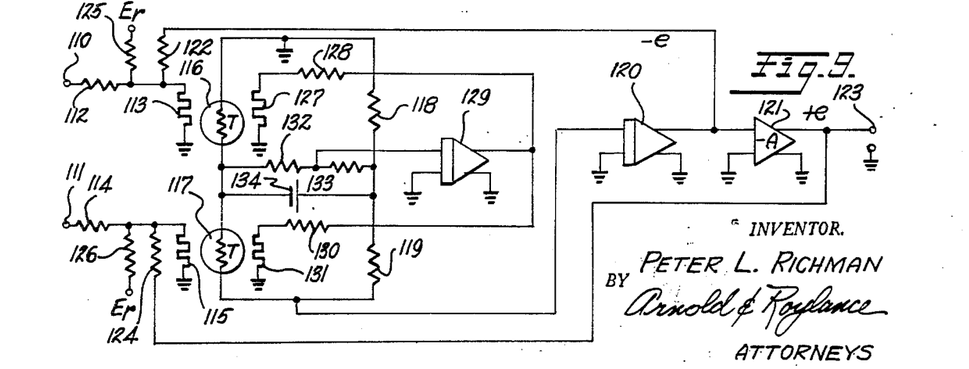
FIG. 9 is a schematic diagram of a seventh embodiment of the invention showing a thermistor circuit having constant temperature operating characteristics.

Referring now to FIG. 9, it will be seen that this final embodiment incorporates features of the circuits of FIG. 6 in which thermistors were used as the temperature sensitive devices and in which the feedback to obtain equithermal operation was connected to the same heater to which the input signal was supplied. Also, the embodiment of FIG. 9 incorporates auxiliary feedback to obtain isothermal operation, but is simpler in form than the embodiments of FIGS. 7 and 8 because the auxiliary feedback is provided to a separate heater for each thermistor.

In FIG. 9, the input signals are applied to input terminals 110 and 111, terminal 110 being connected via a resistor 112 to one terminal of a heater 113, the other terminal of which is grounded. Input terminal 111 is connected via a resistor 114 to one terminal of a heater 115, the other terminal of which is grounded. Heater 113 is thermally coupled to a thermistor 116 and heater 115 is thermally coupled to a thermistor 117. Thermistors 116 and 117 are connected in a bridge circuit, the thermistors forming two adjacent legs of the bridge and a resistor 118 and a resistor 119 forming the other two legs. A junction of thermistor 116 and resistor 118 is grounded and the junction of thermistor 117 and resistor 119 is connected to the terminal of an integrating operational amplifier 120. The output of amplifier 120 is connected to the input terminal of an inverting unity gain operational amplifier 121 and also via a resistor 122 to the ungrounded terminal of heater 113. The output of amplifier 121 is connected to a system output terminal 123 at which the DC voltage proportional to power appears, and is also connected via a resistor 124 to the ungrounded terminal of heater 115. A resistor 125 is connected between the ungrounded terminal of heater 113 and a source of reference potential $E_r$. A resistor 126 is connected between the ungrounded terminal of heater 115 and the source of reference potential $E_r$.

Thermistor 116 is also thermally coupled to a heater 127, one terminal of which is grounded and the other terminal of which is connected via a feedback resistor 128 to the output of an operational integrating amplifier 129. The output of amplifier 129 is also connected via a feedback resistor 130 to one terminal of a heater element 131, the other terminal of which is grounded. Heater 131 is thermally coupled to thermistor 117. The input terminal fo amplifier 129 is connected to an auxiliary bridge circuit incorporating a portion of the above described bridge circuit and including a ressitor 132 and a resistor 133, connected between the junction of thermistors 116 and 117 and the junction of resistors 118 and 119 the series circuit including resistors 132 and 133 being connected in parallel with a battery 134.

As described with reference to FIG. 6, the compensating feedback in FIG. 9 to provide equithermal operation is derived from the signal appearing at the bridge output terminal, in this case at the junction of thermistor 117 and 119. This DC signal is integrated and amplified to provide a voltage $-e$ which is fed via resistor 122 to heater 113. In this feedback system, feedback voltage $-e$ is combined with a reference voltage $E_r$ and additively supplied with the input voltage to heater 113. Likewise, the inverted signal $+e$ is taken from the output of amplifier 121 and fed back via resistor 124 to heater 115. Also as described with reference to FIG. 6, this embodiment is limited to situations in which the signals applied to input terminals 110 and 111 are purely AC signals, so that the input signals and the feedback signals are orthogonally related and can be additively combined in the heater elements.

In addition to the equithermal operation obtained as thus described, the embodiment of FIG. 9 provides a simple method of obtaining isothermal operation from the auxiliary bridge circuit including resistors 118, 132, and 133, and thermistor 116. The output terminal of this bridge circuit, between resistors 132 and 133, is connected to integrating amplifier 129 and fed back to auxiliary heaters 127 and 131. Thus, when the value of resistor 132 is initially selected to be equal to thermistor 116, and also equal to resistor 118 and resistor 133, the output signal appearing at the auxiliary bridge output terminal will be zero so long as the thermistor operating point does not change. If a change begins to occur, the voltage provided by amplifier 129 will tend to restore that operating point to its initial condition, thus resulting in isothermal operation. The modulator circuits of FIGS. 7 and 8 are unnecessary in the embodiment of FIG. 9, as there is no effort being made to additively combine the auxiliary bridge output voltage with any other voltages as was done in the summing amplifiers 90 and 91 in FIG. 8.

While certain advantageous embodiments have been chosen to illustrate the invention, it will be understood by those skilled in the art that various changes and modifications can be made therein without departing from the scope of the invention as defined in the appended claims.

What is claimed is:

1. Apparatus for producing a voltage proportional to the product of two quantities comprising the combination of
   a first input terminal to which can be applied on electrical signal representative of the algebraic sum of the two quantities;
   a second input terminal to which can be applied an electrical signal representative of the algebraic sum of one of said quantities and the negative of the other of said quantities;
   first and second thermoelectric transducer means each including
       temperature responsive circuit means for providing a DC voltage which varies with variations in temperature, and
       heater means for converting electrical current into thermal energy, said heater means being thermally coupled to said temperature responsive means,
   said temperature responsive circuit means of said first and second transducers being connected in series circuit relationship;
   circuit means interconnecting said first input terminal and said heater means of said first transducer means, and said second input terminal and said heater means of said second transducer means; and
   means coupled to said temperature responsive circuit means for generating first and second feedback signals as a function of the difference between temperature responsive characteristics of said temperature responsive circuit means, one of said feedback signals being a voltage proportional to the product of said two quantities.

2. In an apparatus for producing a DC voltage linearly proportional to the power of an electrical signal to be measured, the apparatus being provided with a first externally generated current proportional to the sum of the voltage and curernt of the signal to be measured and with a second externally generated current proportional to the difference between the voltage and the current of the signal to be measured, the combination of
   a first thermoelectric transducer having a first terminal to which electrical signals can be applied, a second terminal to which electrical signals can be applied, a third input terminal and an output terminal,
       said first transducer being characterized by an approximate square-law relationship between the current applied to one of said first and second terminals and the voltage at said output terminal;
   a second thermoelectric transducer having a first terminal to which electrical signals can be applied, a second terminal to which electrical signals can be applied, and an output terminal,
       said second transducer being characterized by an approximate square-law relationship similar to said first transducer,
       said output terminal of said second transducer being connected to said third input terminal of said first transducer;
   amplifier circuit means connected to said output terminal of said first transducer for accepting the voltage at said output terminal and for amplifying said voltage, said amplifier means having an output terminal;
   a first feedback circuit connected between said output terminal of said amplifier means and said second terminal of said first transducer;
   a second feedback circuit connected between said output terminal of said amplifier means and said second terminal of said second transducer;
   an inverter amplifier connected in series circuit relationship in said second feedback circuit; and
   an output terminal coupled to the output of said inverter amplifier.

3. An apparatus according to claim 2 wherein said amplifier circuit means comprises an integrating amplifier.

4. An apparatus according to claim 2 wherein said first thermoelectric transducer comprises
   a thermocouple connected between said third input terminal and said output terminal;
   a first heater element connected to said first terminal and thermally coupled to said thermocouple; and
   a second heater element connected to said second terminal and thermally coupled to said thermocouple; and
said second thermoelectric transducer comprises
   a thermocouple connected to said output terminal;
   a third heater element connected to said first input terminal and thermally coupled to said thermocouple; and
   a fourth heater element connected to said second terminal and thermally coupled to said thermocouple.

5. An apparatus according to claim 2 wherein said first thermoelectric trnasducer comprises
   a thermocouple connected between said third input terminal and said output terminal,
   a first heater element connected between said first terminal and thermally coupled to said thermocouple, and
   resistor means interconnecting said first heater element and said second terminal; and
said second thermoelectric transducer comprises
   a thermocouple connected to said output terminal,
   a second heater element connected to said first input terminal and thermally coupled to said thermocouple, and
   resistor means interconnecting said second heater element and said second input terminal;
said apparatus further comprising
   a source of DC voltage, and
   resistor means interconnecting said source and said first input terminals.

6. An apparatus of the type described comprising the combination of
   a first thermoelectric transducer including
       first temperature responsive means for providing a DC voltage the magnitude of which varies with temperature, and
       heater means thermally coupled to said first temperature responsive means;
   a second thermoelectric transducer including
       second temperature responsive means for providing a DC voltage the magnitude of which varies with temperature, said second temperature responsive means being connected in series circuit relationship with said first temperature responsive means, and
heater means thermally coupled to said second temperature responsive means;
a first input terminal to which a first electrical input signal can be applied, said first signal being representative of the sum of two quantities;
a second input terminal to which a second electrical signal can be applied, said second signal being representative of the difference between said two quantities;
circuit means connecting said first input terminal to said first heater means and said second input terminal to said second heater means;
a source of reference DC voltage coupled to said first and second heater means;
first amplifier circuit means having an input terminal and an output terminal, said input terminal being connected to one end of said series connection of said first and said second temperature responsive means;
feedback circuit means for providing the output of said first amplifier circuit means to said first heater means as a compensating feedback signal;
second amplifier circuit means having an input terminal and an output terminal, said input terminal being coupled to said output terminal of said first amplifier circuit means;
feedback circuit means for providing the output of said second amplifier circuit means to said second heater means as a compensating feedback signal; and
the voltage appearing at said output terminal of said second amplifier circuit means being linearly proportional to the product of said two quantities.

7. An apparatus according to claim 6 wherein said first and second temperature responsive means each comprises a thermocouple.

8. Apparatus in acocrdance with claim 7 wherein said first amplifier circuit means comprises an integrating amplifier.

9. An apparatus according to claim 6 wherein said first and second temperature responsive means each comprises a resistor the resistance of which varies with temperature,
said apparatus further comprising
a bridge circuit including said series connection of said first and second temperature responsive resistors as two adjacent legs thereof; and
a source of DC voltage connected between the junction of said two temperature responsive resistors and the opposite side of said bridge circuit.

10. Apparatus in accordance with claim 9 wherein said first amplifier circuit means comprises an integrating amplifier.

11. An apparatus of the type described comprising the combination of
a first thermoelectric transducer including
first temperature responsive means for providing a DC voltage the magnitude of which varies with temperature, said means having an output terminal,
first heater means; and
second heater means,
said first and second heater means being thermally coupled to said first temperature responsive means;
a second thermoelectric transducer including
second temperature responsive means for providing a DC voltage the magnitude of which varies with temperature, said second temperature responsive means having an output terminal,
said second temperature responsive means being connected in series circuit relationship with said first temperature responsive means,
said series circuit having an output terminal,
third heater means, and
fourth heater means,
said third and fourth heater means being thermally coupled to said second temperature responsive means;
a first input terminal to which a first electrical input signal can be applied;
a second input terminal to which a second electrical input signal can be applied;
circuit means connecting said first input terminal to said first heater means and said second input terminal to said third heater means;
modulator circuit means coupled to a point between said first and second temperature responsive means for producing an AC voltage the magnitude of which is proportional to characteristic differences between said first and second thermoelectric transducer means;
a source of reference DC voltage;
first amplifier circuit means connected to said output terminal of said series connection of thermoelectric transducers for providing an amplified form of said transducer output;
second amplifier means connected to the output of said first amplifier means for providing a signal in inverted form of said transducer output, said signal constituting the apparatus output signal;
first summing amplifier means for combining the voltages from said DC source, said output terminal of said modulator circuit means and said first amplifier circuit means and for providing the combined signal as a feedback to said second heater means; and
second summing amplifier means for combining the voltages from said DC source, said output terminal of said modulator circuit means and said second amplifier means and for providing the combined signal as a feedback to said fourth heater means.

12. An apparatus according to claim 11 wherein said first and second temperature responsive means each comprises a thermocouple.

13. An apparatus according to claim 11 wherein said first and second temperature responsive means each comprises a resistor the resistance of which varies with temperature.

14. In an apparatus for producing a DC voltage linearly proportional to the power in an electrical signal when provided with a first signal representative of the sum of the voltage and the current in the signal to be measured and a second signal representative of the difference between the voltage and the current in the signal to be measured, the combination of
a first thermoelectric transducer including
a first resistor having a resistance which varies with temperature,
a first heater element, and
a second heater element;
a second thermoelectric transducer including
a second resistor having a resistance which varies with temperature,
a third heater element, and
a fourth heater element;
an electrical bridge circuit having an output terminal, said bridge circuit including said first and second resistors connected in series circuit relationship between said output terminal and a point of reference potential;
a first source of DC voltage connected across said bridge circuit between points of equal potential when said bridge circuit is balanced;
a voltage divider circuit connected in parallel circuit relationship with said first DC source;
a first input terminal to which can be applied a first signal representative of the algebraic sum of the voltage and current of an electrical signal;

circuit means interconnecting said first terminal and said first heater element;

a second input terminal to which can be applied a second signal representative of the algebraic sum of the voltage and the negative of the current of an electrical signal;

circuit means interconnecting said second terminal and said second heater element;

first amplifier circuit means having an input terminal and an output terminal,
    said input terminal being connected to a point on said voltage divider circuit;

first feedback circuit means interconnecting said output terminal of said first amplifier circuit means and said third and fourth heater elements to provide feedback signals to said heaters as a function of bridge unbalance;

second amplifier circuit means having an input terminal and an output terminal,
    said input terminal being connected to said output terminal of said bridge circuit;

second feedback circuit means interconnecting said output terminal of said second amplifier circuit means and said first heater element;

third amplifier circuit means having an input terminal and an output terminal, the voltage at said output terminal being a DC voltage proportional to the power in the electrical signal being measured,
    said input terminal of said third amplifier means being connected to said output terminal of said second amplifier means; and third feedback circuit means interconnecting said output terminal of said third amplifier circuit means and said second heater element.

15. Apparatus for producing a voltage linearly proportional to the power in an electrical signal comprising the combination of a plurality of thermoelectric transducer means, each for providing an output electrical signal representative of an electrical signal provided thereto;

circuit means for providing one of a plurality of externally generated input signals to each of said transducer means,
    each externally generated input signal being representative of a characteristic of the input power signal;

circuit means interconnecting said transducer means for combining said output electrical signals;

integrating circuit means for integrating the combined output electrical signals; and feedback circuit means for accepting the integrated combined output signals and for providing an electrical feedback signal to each of said transducer means, at least one of said feedback signals being linearly proportional to the power in said input power signal.

16. Apparatus for producing a DC voltage linearly proportional to the power in an electrical input power signal, the apparatus being provided with first and second externally generated input signals each characteristic of the input power signal to be measured, comprising the combination of first thermoelectric transducer circuit means for providing a DC voltage which varies as a function of an electrical signal supplied thereto;

first circuit means for providing to said first transducer circuit means a first externally generated input signal representative of a characteristic of the input power signal;

second thermoelectric transducer circuit means for providing a DC voltage which varies as a function of an electrical signal supplied thereto;

second circuit means for providing to said second transducer circuit means a second externally generated input signal representative of a characteristic of the input power signal;

third circuit means connected to said first and second transducer means for combining said DC voltages; and a feedback circuit means for accepting the combined DC voltages and for generating first and second feedback signals and for providing said feedback signals to said first and second transducer circuit means, respectively,
    one of said feedback signals being a DC voltage which is linearly proportional to the power in said input power signal.

References Cited

UNITED STATES PATENTS

| | | | |
|---|---|---|---|
| 3,129,323 | 4/1964 | Stout et al. | 235—151.1 |
| 3,210,663 | 10/1965 | Moseley et al. | 324—140 |
| 3,391,275 | 7/1968 | Bullock et al. | 235—151.1 |
| 3,201,572 | 8/1965 | Yetter | 235—151 |

MALCOLM A. MORRISON, Primary Examiner

EDWARD J. WISE, Assistant Examiner

U.S. Cl. X.R.

235—194, 151.3, 151.21; 324—142

Disclaimer and Dedication

3,486,014.—*Peter L. Richman*, Lexington, Mass. POWER TO DC CON-
VERTER. Patent dated Dec. 23, 1969. Disclaimer and dedication filed
Mar. 17, 1971, by the assignee, *Weston Instruments, Inc.*

Hereby enters this disclaimer to the remaining term of said patent and
dedicates said patent to the Public.

[*Official Gazette April 27, 1971.*]